(12) United States Patent
Fujioka et al.

(10) Patent No.: US 6,527,637 B2
(45) Date of Patent: Mar. 4, 2003

(54) VIDEO GAME WITH SPLIT SCREEN AND AUTOMATIC SCROLLING

(75) Inventors: Kenji Fujioka, Nishinomiya (JP); Hideto Inoue, Ashiya (JP); Naoki Nishikawa, Kobe (JP); Hiroshi Miyaoka, Osaka (JP)

(73) Assignee: Kceo Inc., Osaka-fu (JP)

( * ) Notice: Subject to any disclaimer, the term of this patent is extended or adjusted under 35 U.S.C. 154(b) by 154 days.

(21) Appl. No.: 09/736,106

(22) Filed: Dec. 13, 2000

(65) Prior Publication Data

US 2001/0006908 A1 Jul. 5, 2001

(30) Foreign Application Priority Data

Dec. 14, 1999 (JP) ............................................ 11-355191

(51) Int. Cl.[7] ................................................ A63F 13/00
(52) U.S. Cl. ................................ 463/4; 463/30; 463/31
(58) Field of Search ................................. 463/4, 30, 31

(56) References Cited

U.S. PATENT DOCUMENTS 4,672,541 A * 6/1987 Bromley et al. ................ 463/3
5,080,377 A * 1/1992 Stamper et al. ............. 345/788
5,411,270 A * 5/1995 Naka et al. ..................... 463/33

FOREIGN PATENT DOCUMENTS

| EP | 0700010 | 3/1996 |
| EP | 0911069 | 4/1999 |
| JP | 61-113489 | 5/1986 |
| JP | 06-134142 | 5/1994 |

* cited by examiner

*Primary Examiner*—Jessica Harrison
*Assistant Examiner*—Corbett B. Coburn
(74) *Attorney, Agent, or Firm*—Jordan and Hamburg LLP

(57) ABSTRACT

A game image representing an infield as a specific game image in a game space of a baseball game is displayed on a display surface of a monitor 5 as a reference game image. According to the position of a game medium character, for example, representing a baseball which serves as a game situation, the display of the reference game is switched to that of a combined game image. For example, if the ball flies in a direction toward an outfield (outfield direction), the outfield neighboring a partial game image displayed in the half of the display surface in the outfield direction within the reference game image is displayed as an adjacent game image instead of the partial game image. Accordingly, a game situation and a game progress can be easily grasped and a game operation can be more smoothly performed.

14 Claims, 7 Drawing Sheets

VIDEO GAME WITH SPLIT SCREEN AND AUTOMATIC SCROLLING

The present invention relates to a video game apparatus for displaying game images to execute a specified game in a game space on a display surface of a monitor, a game image display control method and a readable storage medium.

BACKGROUND OF THE INVENTION AND RELATED ART STATEMENT

As a video game in which game images are displayed on a display surface of a monitor to execute a specified game in a game space, a baseball game is, for example, known. In the baseball game, if a huge ground is entirely displayed on the display surface of the monitor, images of bases, players and the like become small, which is inconvenient in progressing the game. Accordingly, if, for example, a ball (character) hit by a batter (character) has flown to the outfield, the game image is moved to an outfield area following the ball, whereas a small screen is provided as a window at an end of the display surface to display the infield to show movements of runner(s).

With the conventional display method, a game player needs to proceed a game while viewing the game image displaying the outfield area to which the ball has flown and the small screen separate from the game image of the ground and displayed in a reduced size at the end of the display surface. This presents a problem of difficulty to play a game while grasping a game state and a game progress. Particularly, if the video game apparatus is of the portable type in which a monitor and an operation unit are integrally provided, it is difficult to distinguish the display content on the small screen unless the game player fixes his eyes since the monitor is unavoidably small.

SUMMARY OF THE INVENTION

In view of the above problems residing in the prior art, an object of the present invention is to provide a video game apparatus and a game image display control method which enable the progress of a game to be easily grasped and a game operation to be smoothly performed, and a readable storage medium.

In order to fulfill the above object, a video game apparatus, according to the present invention, comprises a monitor on which game images are displayed and display control means for displaying the game images on a display surface of the monitor to execute a specified game in a game space. Where the display control means includes (i) reference image display means for displaying a specific game image in the game space as a reference game image, (ii) combined image display means for producing a combined game image by displaying an adjacent game image neighboring outside a partial game image along a first direction within the reference game image in place of the partial game image, and (iii) switch control means for switching the display of the reference game image and that of the combined game image to each other according to a game situation.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1B:
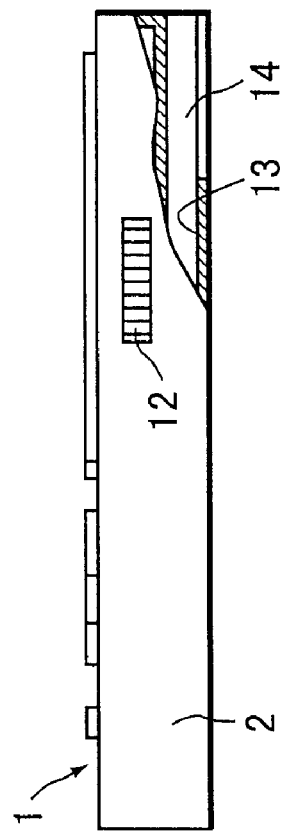
FIGS. 1A and 1B are a plan view and a side view showing the construction of a video game apparatus to which a game image display control method according to one embodiment of the invention is applied.
Figure 1A:
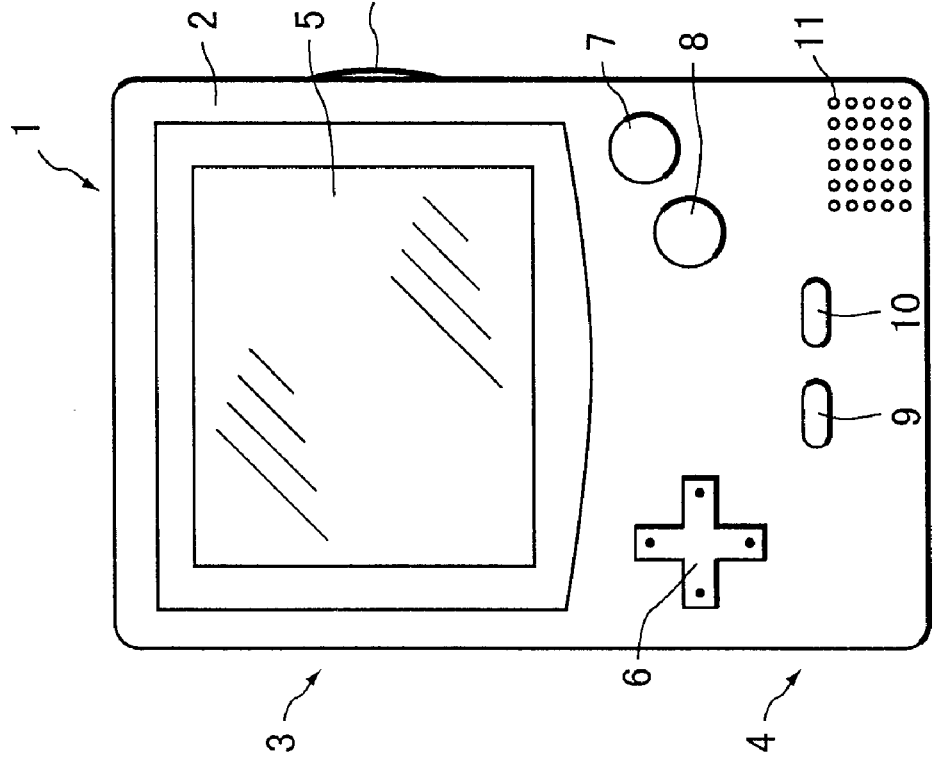

FIGS. 1A and 1B are a plan view and a side view showing the construction of a video game apparatus to which a game image display control method according to one embodiment of the invention is applied. In this embodiment, a video game apparatus 1 is a portable game device and is constructed such that a single-player game in which a computer is an opponent and a dual-player game in which two persons compete with each other by connecting two video game apparatus via a cable or the like so as to enable a communication are selectable. As shown in FIGS. 1A and 1B, the video game apparatus 1 is provided with an outer casing 2 having a built-in controller and the like, a display unit 3 formed on an upper part of the front surface of the outer casing 2, and an operation unit 4 formed on a bottom part of the front surface of the outer casing 2.

In the display unit 3 is arranged a monitor 5 formed of a liquid crystal panel or the like for displaying images. The operation unit 4 includes a cross-button 6 provided on the left side, first and second push buttons 7, 8 provided on the right side, and a start button 9 and a select button 10 provided below and between the cross-button 6 and the first and second push buttons 7, 8.

A sound generator 11 is provided at the bottom right corner of the front surface of the outer casing 2, and a volume adjusting member 12 is provided on the right side surface of the outer casing 2. Further, a ROM-cassette mounting portion 13 is formed in the upper half of the rear surface of the outer casing 2. In this embodiment, a baseball game is played in the video game apparatus 1. On the monitor 5 are displayed player characters simulating actual baseball players or the like and a ball as a game medium character.

The monitor 5 selectively displays a game mode selection screen, screens used to input various data and the like if necessary before the start of the game, and suitably displays a plurality of game images and the like after the start of the game. The cross-button 6 has four direction instructing sections. For example, the cross-button 6 is used to move a hit cursor for adjusting a hitting position of a batter in the case of batting, to designate a base in the case of base running, to designate the type of ball thrown in the case of pitching and to designate movements of the respective players and a base to which the ball is supposed to be thrown in the case of fielding.

The first push button 7 is used, for example, to cause a batter to swing in the case of batting, and to return a runner to a designated base in the case of base running, to give an instruction to start throwing a ball in the case of pitching, and to cause a fielder to make a fine play in the case of fielding by being operated together with the cross-button 6. Further, the second push button 8 is used, for example, to designate swing of the bat to one of normal swing and strong swing in the case of batting, to cause a runner to steal a base in the case of base running by being operated together with the cross-button 6, to designate a base to which a pick-off throw should be made in the case of pitching by being operated together with the cross-button 6 and to relay the throw in the case of fielding.

Besides starting the game, the start button 9 is used, for example, to designate a bunt in the case of batting and to designate an exchange of the pitcher or the fielder in the case of fielding by being operated together with the cross-button 6. Besides designating a game mode, the select button 10 is used, for example, to return the hit cursor to a center position of the base in the case of batting.

The sound generator 11 is formed by building a speaker inside the outer casing 2 and adapted to output a specified game music, sound effects and the like as the game progresses. The volume adjusting member 12 is adapted to adjust the volumes of the game music, sound effects and the like outputted from the speaker. A ROM cassette 14 in which a game program and data including various image data for constructing a game space are written is detachably mountable in the ROM-cassette mounting portion 13. A connector is provided in the ROM-cassette mounting portion 13 and a connector mounted at the leading end of the ROM cassette 14 is inserted thereinto to electrically connect the ROM cassette 14 with the controller inside.

In the video game apparatus 1 thus constructed, a baseball game can be played by, for example, pushing the cross-button 6 by the thumb of the left hand and suitably selectively pushing the first and second push buttons 7, 8, the start button 9 and/or the select button 10 by the right hand while the left and right sides of the outer casing 2 are held by both hands.

Figure 2:
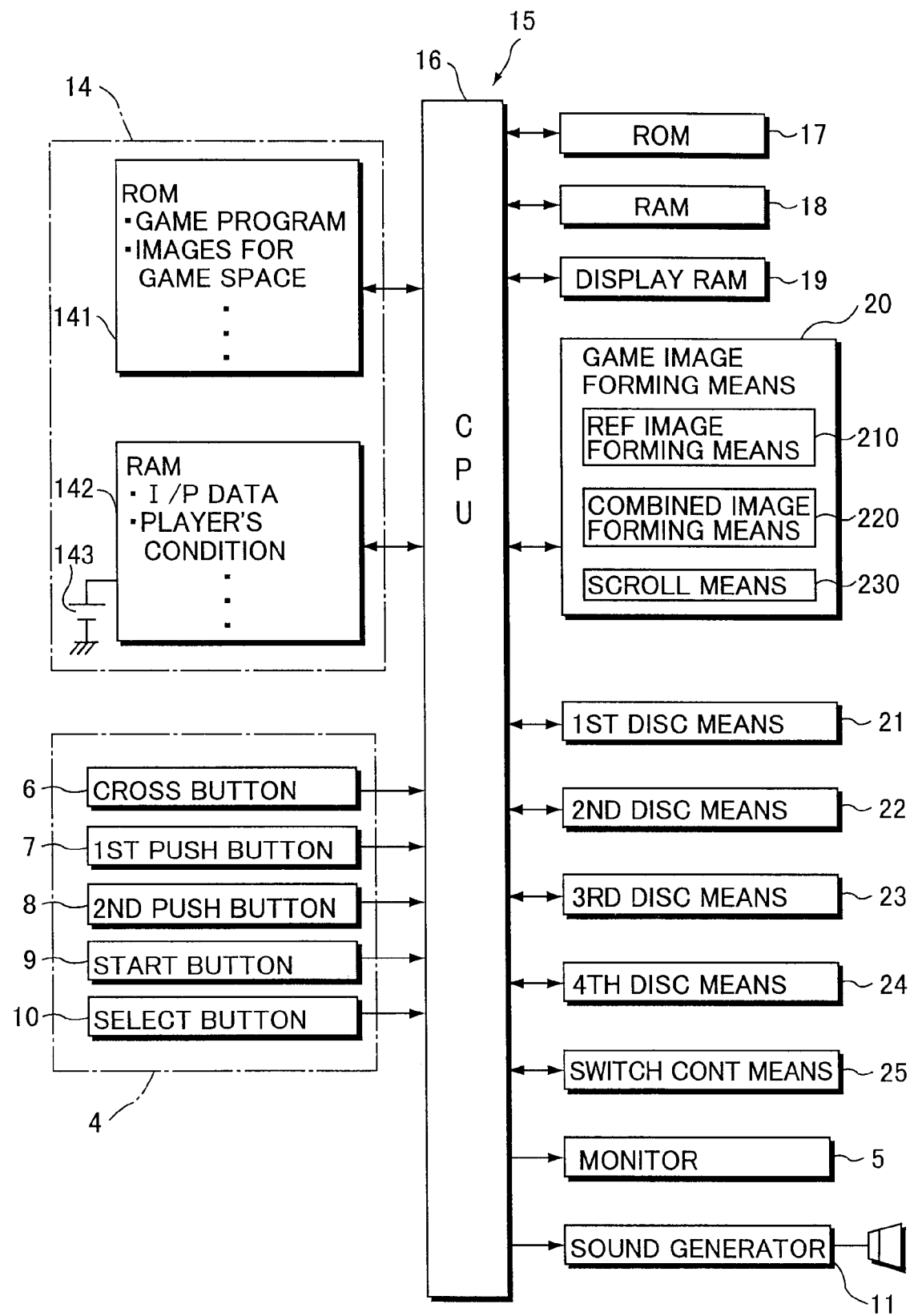
FIG. 2 is a block diagram showing the control construction of the video game apparatus shown in FIG. 1.

FIG. 2 is a block diagram showing an exemplary control construction of the video game apparatus 1. A controller 15 performs a game processing in response to a command corresponding to the operation content of the operation unit 4 based on the game program stored in the ROM cassette 14 and various data including various image data forming the game space, and includes a CPU 16 for performing calculations, a ROM 17 for storing a control program and the like for controlling the display on the monitor 5, and a RAM 18 for temporarily storing processed data.

The CPU 16 are connected with the monitor 5, the cross-button 6, the first and second push buttons 7, 8, the start button 9, the select button 10, the sound generator 11 and the ROM cassette 14. In addition to a display RAM 19, a game image forming means 20, a first discriminating means 21, a second discriminating means 22, a third discriminating means 23, a fourth discriminating means 24 and a switch control means 25 which are provided as function means based on the game program read from the ROM cassette 14 are connected with the CPU 16.

The ROM cassette 14 includes a ROM 141 for storing game programs, images forming the game space, etc.; a RAM 142 for temporarily storing various input data including the fielding positions of the respective players, the batting order, degrees of physical condition of the respective players, and the like; and a built-in back-up battery 143 of the RAM 142.

One screen of image to be displayed on the display surface of the monitor 5 is written in the display RAM 19. For example, the image is alternately and repeatedly written in and read from the display RAM 19 in a cycle of 1/60 sec., so that stable images can be displayed on the monitor 5 due to the afterimage phenomenon.

The game image forming means 20 determines a game image in dependence on the operation contents of the cross-button 6, the first and second push buttons 7, 8, the start button 9 and the select button 10 of the operation unit 4, the game program stored in the ROM 141 and the content of the RAM 142, and forms a specified display image in the display RAM 19.

The game image forming means 20 is provided with a first game image forming means (reference image display means) 210, a second game image forming means (combined image display means) 220 and a scroll image forming means 230. The first game image forming means 210 forms a display image as a first game image (reference game image) centering particularly on the infield area in the display RAM 19. Instead of a partial game image located in an outfield direction (direction toward the outfield) within the first game image, the second game image forming means 220 displays a display image as a second game image (adjacent game image) located in the outfield direction of the partial game image to produce a combined game image. The scroll image forming means 230 forms a display image for scrolling the first and second game images in specified directions, respectively, in the display RAM 19.

The first game image forming means 210, the second game image forming means 220 and the scroll image forming means 230 are constructed as function realizing means in the CPU 16. A display control means is constructed by the controller 15 and the game image forming means 20; a reference image display means is constructed by the controller 15 and the first image forming means 210; a combined image display means is constructed by the controller 15 and the second image forming means 220; and a scrolling means is constructed by the controller 15 and the scroll image forming means 230.

The first discriminating means 21 discriminates whether a ball as a game medium character hit by a batter has reached a predetermined position (e.g. an end position in the outfield direction within the first game image or a position inwardly spaced away from this end position by a specified distance) within the first game image by flying toward the outfield. The second discriminating means 22 discriminates whether the first game image has been scrolled by a specified distance in a direction opposite from the moving direction of the ball.

The third discriminating means 23 discriminated whether the ball has reached a predetermined position (e.g. an end position in an infield direction (direction toward the infield) within the second game image or a position inwardly spaced away from this end position by a specified distance) within the second game image in the case that the ball flown from the first game image is caught by an outfielder and returned toward the first game image side. The fourth discriminating means 24 discriminates whether the divided first game image has been restored to its initial state, i.e. the game image has been switched from the combined game image to the reference game image.

The switch control means 25 controls the game image forming means 20 to switch a display between that of the first game image and that of the combined game image.

In the video game apparatus thus constructed, a baseball game is played by the game player, for example, as follows. Here, it is assumed that the single-player game is selected.

First, after the single-player game is selected, two teams to compete with each other are selected and specified data including the fielding positions of the respective players and the batting order are inputted. The game is started by pressing the start button 9 after selecting which team bats first. At this stage, a special image centering on a batter standing at the batter痴 box and a pitcher who throws a ball to this batter is displayed for a game operation at the time of batting (pitching).

Now assuming that the game player is at the offense side, the hit cursor is moved to a suitable position through the operation of the operation unit 4 by, for example, predicting the position of a ball to be thrown by the pitcher while viewing the position of a mitt of a catcher. A bat is swung at the right timing to meet the ball thrown by the pitcher by the operation of the operation unit 4. If the bat hits the ball, the ball flies in a specified direction and the batter starts running toward the first base.

On the other hand, if the game player is at the defense side, a throwing course is determined by operating the position of the mitt of the catcher while selecting the type of the ball thrown by the pitcher by the operation of the operation unit 4. If the batter hits the ball thrown by the operation of the operation unit 4, an infielder or outfielder throws the ball he caught to a specified base by the operation of the operation unit 4. A point is given to the opponent if a runner returns to the home plate, and a victory is determined based on which team has a higher score after completion of a predetermined number of innings. This game is made highly interesting and ingenuous by being proceeded while the abilities and weak points of the players set in advance are referred to.

Figure 3:
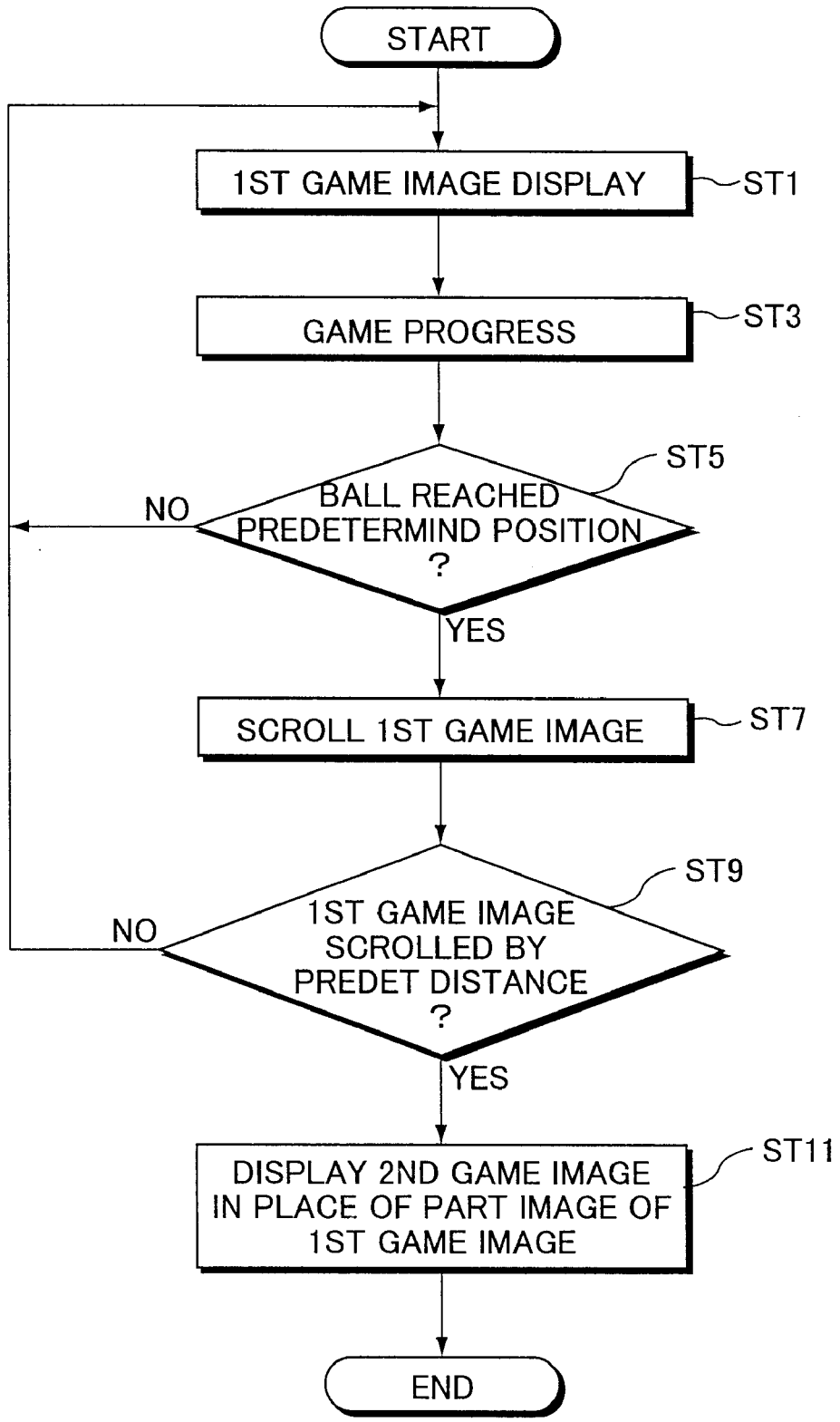
FIG. 3 is a flow chart showing the operation of the video game apparatus shown in FIG. 1, FIGS. 4 to 6 are diagrams showing game images displayed on a liquid crystal panel of the video game apparatus shown in FIG. 1.

Next, a game image display control method in the case that the ball thrown by the pitcher and hit by the batter flies to the outside of the display area of the first game image as the game progresses is described with reference to a flow chart of FIG. 3.

First, the first game image is displayed (Step ST1) when the ball thrown by the pitcher is hit by the batter. The first game image includes the infield area of the ground and part of the outfield area as shown, for example, in FIG. 4. Here, a pitcher Pi, a first baseman Fr, a second baseman Se, a third baseman Th, a shortstop Sh, a runner Ru and a ball Ba are displayed in the infield area.

In this embodiment, the ball Ba has at least three-dimensional coordinate values. A shadow of the ball Ba is displayed on a ground surface immediately below the ball Ba in order to indicate that the ball Ba is at a low position if a distance between the ball and the shadow is short while being at a high position if this distance is long.

Figure 4:
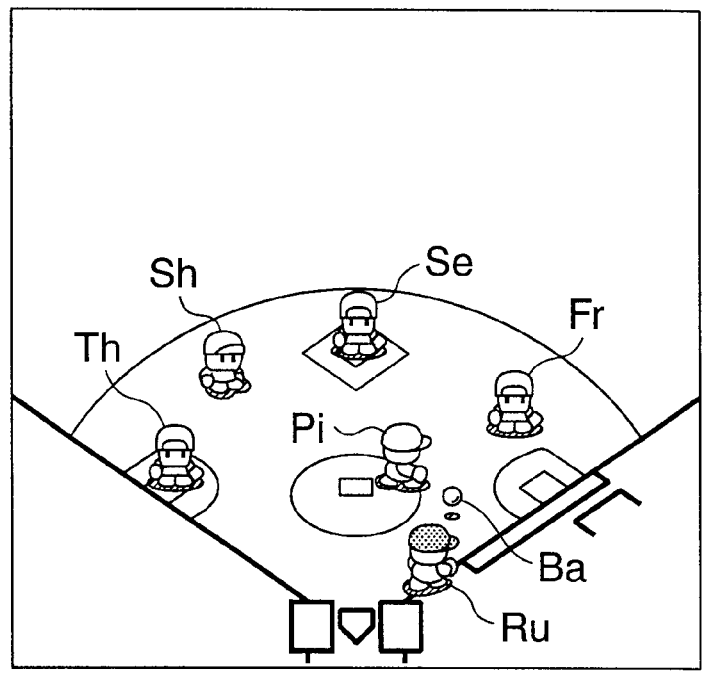

In the first game image shown in FIG. 4, the game is proceeded by moving the ball Ba hit by the batter in the outfield direction and causing the runner Ru to run toward the first base (Step ST3). Subsequently, the first discriminating means 21 discriminates whether the flying ball Ba has reached the predetermined position within the first game image (Step ST5). This discrimination is made based on the two-dimensional coordinate values of the ball Ba. The two-dimensional coordinate values of the ball Ba can be given from two-dimensional coordinate systems obtained by deleting a height coordinate from the three-dimensional coordinate systems within the game space (ground), but may be given from coordinates of the display position of the ball Ba on the screen, coordinates of the display position of the shadow of the ball Ba on the screen or coordinates of an intermediate position between the ball Ba and its shadow on the screen. This routine returns to Step ST1 to repeat the subsequent Steps if the discrimination result in Step ST5 is negative.

If a locus of movement of the ball Ba coincides with the position of an infielder or outfielder, the first discriminating means 21 discriminates whether the ball Ba flew above this fielder by comparing the height of the ball Ba and a height data set for this fielder (data indicating a height at which the ball Ba can be caught by him). If the coordinate value of the ball Ba is equal to or below the height data of the fielder, the game is proceeded assuming, for example, that the ball Ba has been caught by this fielder.

If the discrimination result in Step ST5 is affirmative, the first game image is scrolled in the direction opposite from the moving direction of the ball Ba by the scrolling means (Step ST7). This causes the outfield area to be displayed in a wide range as much as the first game image is scrolled. As a result, the ball Ba which would disappear from the screen by moving from the first game image to the outside of the display area unless the first game image should be scrolled remains displayed within the first game image.

Figure 5:
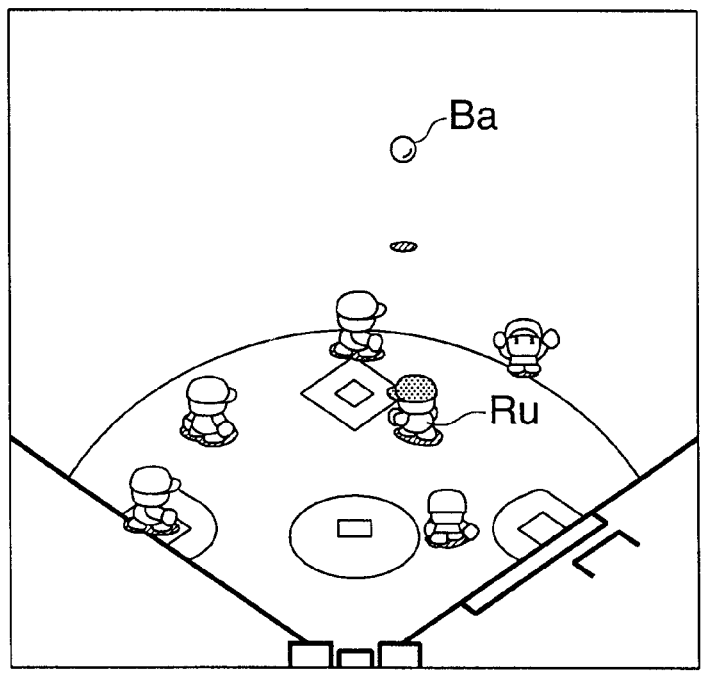

Subsequently, the second discriminating means 22 discriminates whether the first game image has been scrolled in the direction opposite from the moving direction of the ball Ba by a specified distance (Step ST9). This routine returns to Step ST1 to repeat the subsequent Steps if the discrimination result in Step ST9 is negative. In this embodiment, the specified distance as a discrimination criterion in Step ST9 is set at a distance between the pointed end of the home plate and the bottom edge of the display surface of the monitor 5, and discrimination is made based on whether or not the respective two dimensional values coincide. Accordingly, the home plate is substantially concealed as shown in FIG. 5 if the first game image was scrolled in the direction opposite from the moving direction of the ball Ba by the specified distance.

If the discrimination result in Step ST9 is affirmative, the scroll of the first game image is stopped and the displayed image is switched to a combined game image in which a second game image is displayed at the position of a partial game image located in the outfield direction within the first game image (Step ST11). Specifically, instead of the partial game image located in the outfield direction within the first game image (corresponding, for example, to the upper half of the display surface on the monitor 5), the second game image is newly displayed at the position of the partial game image. The second game image is a neighboring image neighboring the partial image (i.e. neighboring the first game image before the switch).

In this way, a remaining area A of the partial game image of the first game image and the second game image B are displayed together on the game screen, thereby completing a display control operation. The second game image is comprised of three outfielders Lf, Cf, Rf, the ball Ba, an outfield fence Gf, and part of stands Ks in this embodiment. Since the game image thus displayed in a combined manner is a discontinuous combined image obtained by deleting the partial game image before the switch, a dividing line L is displayed at the boundary between the remaining area A of the first game image and the second game image B.

Figure 7:
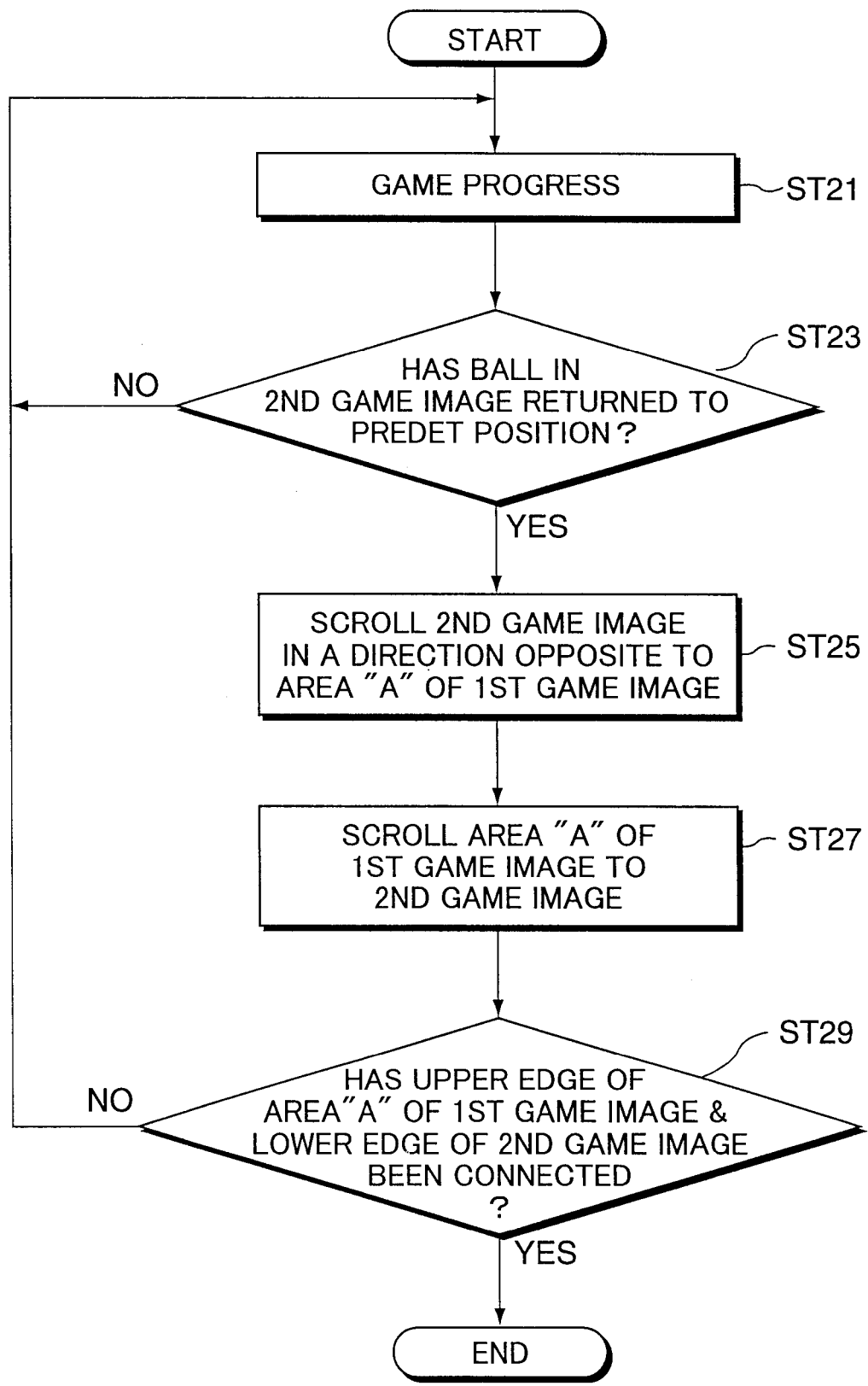
FIG. 7 is a flow chart showing the operation of the video game apparatus shown in FIG. 1.

Next, the game image display control method in the case that the ball is returned from the second game image to the first game image when an outfielder throws (returns) the ball caught by him toward the infield area is described with reference to a flow chart shown in FIG. 7.

Figure 6:
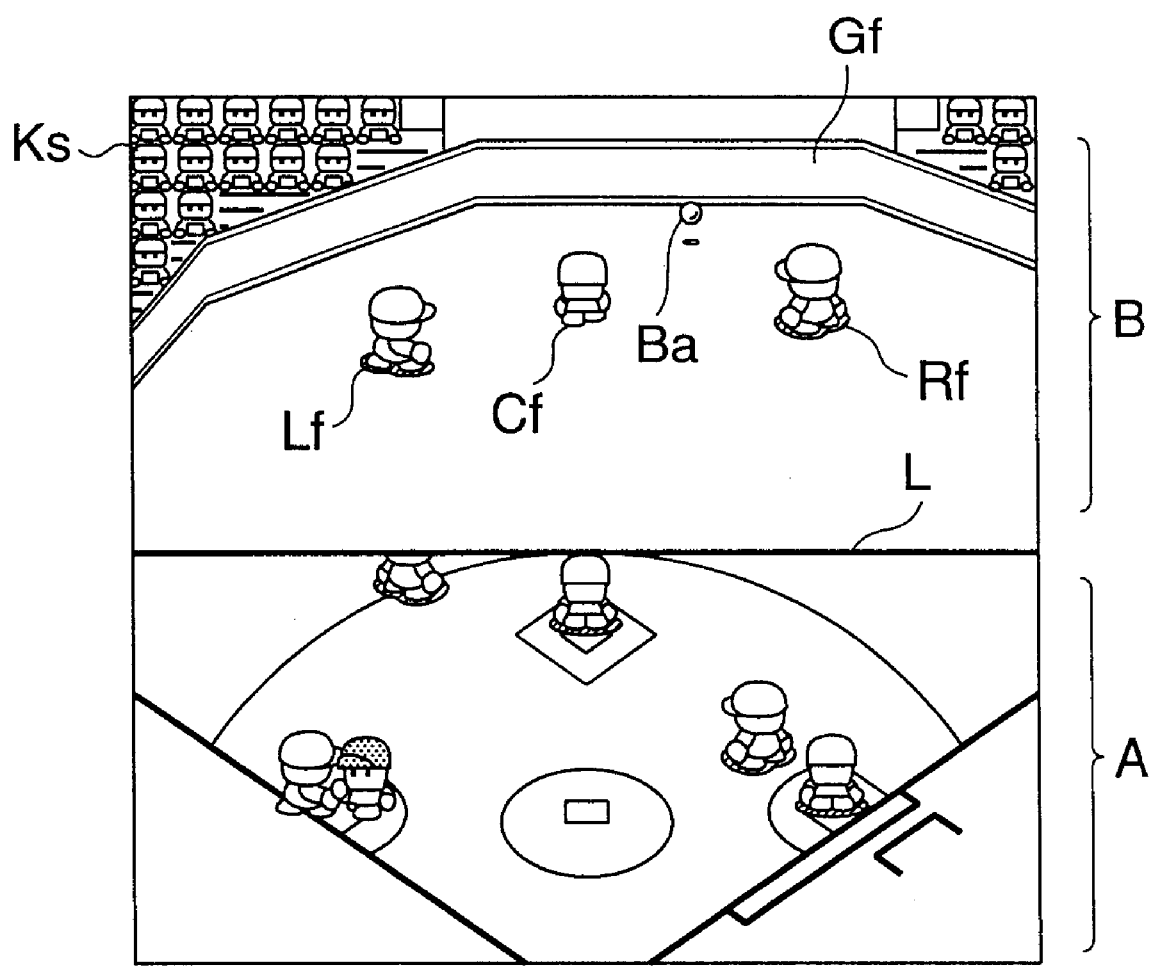
Figure 8:
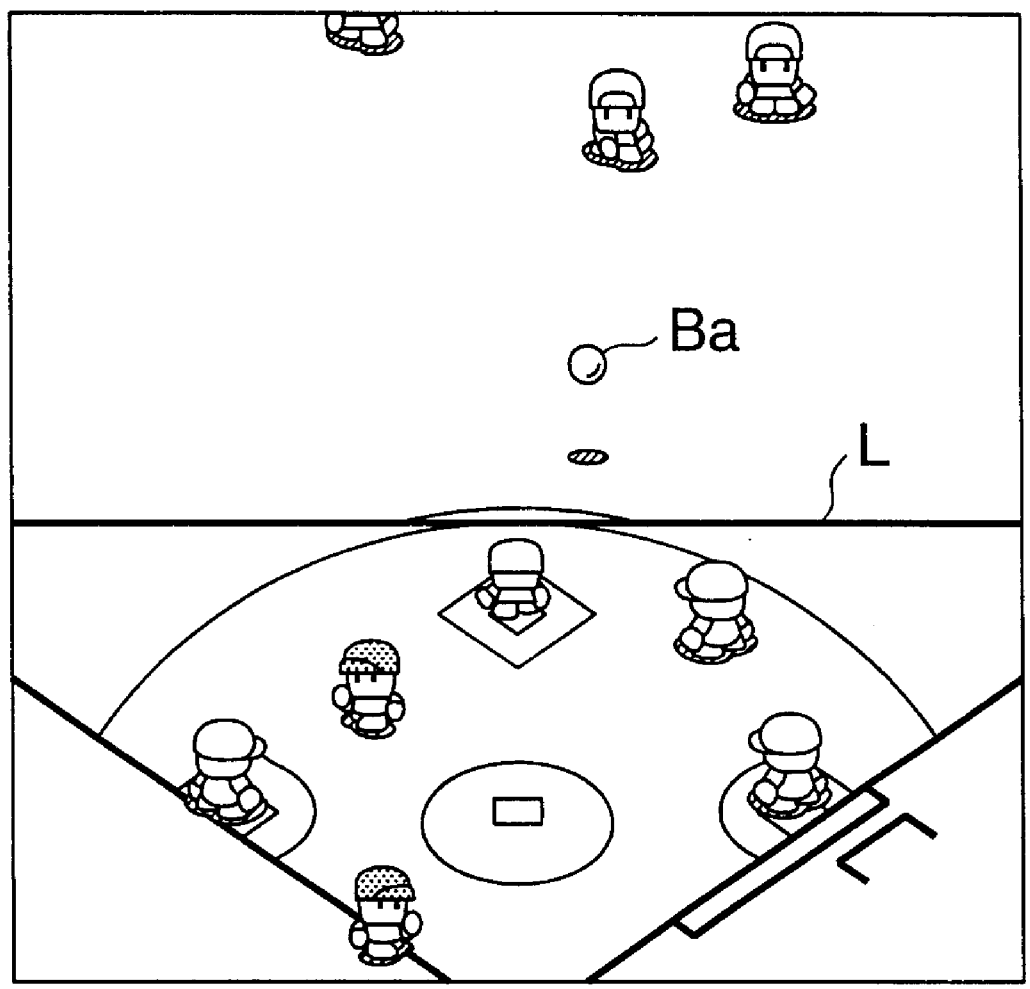
FIG. 8 is a diagram showing a game image displayed on the liquid crystal panel of the video game apparatus shown in FIG. 1.

First, the game is proceeded when the outfielder throws the ball toward the infield area in the game image displayed in a combined manner shown in FIG. 6 (Step ST21). Subsequently, the third discriminating means 23 discriminates whether the thrown ball Ba has returned to a predetermined position in the second game image toward the area A (infield) of the first game image as shown in FIG. 8 (Step ST23). This discrimination is made based on the two-dimensional coordinate values of the ball Ba. This routine returns to Step ST1 to repeat the subsequent Steps if the discrimination result in Step ST23 is negative.

If the discrimination result in Step ST23 is affirmative, the second game image is scrolled in a direction (opposite from the moving direction of the ball Ba) away from the area A of the first game image (Step ST25), and the image in the area A within the first game image is scrolled toward the second game image (Step ST27). The fourth discriminating means 24 then discriminates whether the upper edge of the remaining area A of the first game image has coincided with the bottom edge of the second game image in the coordinate systems of the game space (Step ST29). Specifically, the deleted game space area between the remaining area A of the first game image and the second game image gradually becomes narrower, and the first game image is displayed on the entire display surface instead of the combined game image when the remaining area A and the second game image become continuous in the game space.

This routine returns to Step ST1 to repeat the subsequent Steps if the discrimination result in Step ST29 is negative. This display control operation ends if the discrimination result in Step ST29 is affirmative. Since the first game image is normally scrolled to a smaller degree than the second game image, the routine only goes through Step ST27 if the scroll of the second game image has not been completed in Step ST25 although the operation in Step ST27 has been completed.

In the game image display by the above display control, images (characters) necessary to proceed the game are all displayed in the same size within the same game image. Accordingly, the game player can cause the runner to steal a base while viewing the movements of the outfielders within the second game image in the case of offense, whereas he can return the ball while viewing the movements of the runner(s) within the first game image in the case of defense. Therefore, as compared to the prior art video game apparatus in which the game is proceeded while viewing a small auxiliary screen, the game can more smoothly progress.

The present invention is not limited to the foregoing embodiments, and can be embodied in various other manners as follows.

(1) In the foregoing embodiment, the first game image is scrolled in the direction opposite from the moving direction of the ball Ba when the ball Ba reaches the predetermined position within the first game image. However, the adjacent game image may be displayed in a combined manner immediately after the ball Ba reaches the predetermined position within the first game image without scrolling the first game image in the direction opposite from the moving direction of the ball Ba. In such a case, a game situation means a state where the ball Ba as a game medium character has reached the predetermined position within the first game image.

(2) Although the adjacent game image is directly displayed in a combined manner at the position of the partial game image located in the outfield direction within the first game image in the foregoing embodiment, it may be so displayed as to partly overlap the partial game image by setting the coordinate values of the adjacent game image such that the bottom edge of the adjacent game image is located below the upper edge of the partial game image. With such an arrangement, the ball Ba can be continuously displayed in the case that it is moved from the first game image to the second game image, avoiding an inconvenience that the ball Ba temporarily disappears from the game image.

(3) In the foregoing embodiment, the first and second game images are alternately scrolled in the case that the ball Ba within the second game image is returned to the first game image. However, only the second game image may be scrolled if the first game image is not scrolled in the direction opposite from the moving direction of the ball Ba when the ball Ba is moved from the first game image to the second game image. Further, the first game image may be scrolled after the scroll of the second game image is completed. In such a case, a fifth discriminating means for discriminating whether the scroll of the second game image has been completed may be provided in addition to the first to fourth discriminating means 21 to 24 shown in the block diagram of FIG. 2.

(4) Although the video game apparatus, the game image display control method and the readable storage medium according to the present invention are described as such to execute a baseball game in the foregoing embodiment, the present invention is also applicable to sport games other than the baseball game or games other than sport games. Mainly, the present invention is preferably applicable to such games that the game space is partly displayed and they are characterized by having a reference game space section (infield section in the above baseball game). The reference game space is not limited to a fixed section, but may be changed to a certain degree as the game progresses.

(5) Although the first game image is divided into upper and lower image sections with respect to vertical direction to form a combined image by placing images one over the other in the foregoing embodiment, it may be divided into left and right image sections with respect to transverse direction to form a combined image by placing images one next to the other according to the content of the game. Further, the first game image may be divided into three or more image sections according to the number of the game medium characters, and a combined image may be obtained by displaying suitable images in the respective image sections. In such a case, the image sections may correspond to, for example, a movement of a player character to be noticed in addition to the game medium character(s).

(6) Although the game image is vertically scrolled in the foregoing embodiment, it may be transversely scrolled depending on the content of the game. Alternatively, the game image may be scrolled in a combined direction of the vertical and transverse directions (oblique direction). In other words, any scrolling direction will do as long as it prevents the game medium character from moving to the outside of the display area of the game image so that the position thereof cannot be known to the game player.

(7) In addition to portable type game devices, the present invention is similarly applicable to a game system in which game images are displayed on a television monitor.

As described above, in the inventive video game apparatus in which the game images are displayed on the display surface of the monitor to execute the specified game in the game space, the specific game image in the game space is displayed as a reference game image which is the first game image, the adjacent game image which is the second game image neighboring outside the partial image located in first direction within the reference game image is displayed instead of the partial game image in accordance with the game situation.

Thus, the reference game image and the adjacent game image are displayed as an integral image on the display surface of the monitor. As a result, the game player can simultaneously view the reference game image and the adjacent game image without having any special sense of incongruity, smoothing the progress of the game.

The adjacent game image may be so displayed as to partly overlap the partial game image by setting the coordinate values of the adjacent game image such that the bottom edge of the adjacent game image is located below the upper edge of the partial game image. With such an arrangement, the game medium character such as a ball can be continuously displayed in the case that it is moved from the first game image to the second game image, avoiding an inconvenience that the game medium character temporarily disappears from the game image.

The game situation means the position of the game medium character representing a game medium in the game space, the display control means displays the game medium character moving in the game space in such a manner as to follow it, and the switch control means may switch the display of the reference game image to that of the combined game image when the game medium character reaches the predetermined position in the first direction within the reference game image. With such an arrangement, the game medium character can be effectively displayed in the game image, and the game player can simultaneously view the reference game image and the adjacent game image without having any special sense of incongruity, smoothing the progress of the game.

The switch control means may switch the display of the combined game image to that of the reference game image when the game medium character reaches the predetermined position in the direction opposite from the first direction within the reference game image. With such an arrangement, the game medium character can be effectively displayed in the game image, and the game player can simultaneously view the reference game image and the adjacent game image without having any special sense of incongruity, smoothing the progress of the game.

The reference image display means may scroll the reference game image in the direction opposite from the moving direction of the game medium character by a specified distance when the game medium character reaches a position slightly before the predetermined position in the first direction within the reference game image. With such an arrangement, the game medium character such as a ball can be displayed within the reference game image as much as possible. The game situation may mean a state where the reference game image is scrolled by the specified distance.

The combined image display means may scroll the adjacent game image in the direction opposite from the moving direction of the game medium character when the game medium character in the adjacent game image reaches a position slightly before a predetermined position within the adjacent game image while being moved in the direction opposite from the first direction, and the switch control means may return the display of the combined game image to that of the reference game image when the adjacent game image and the reference game image become continuous in the game space. This enables the combined game image to be naturally switched to the reference game image, i.e. the display on the monitor can be smoothly returned to the original image.

Further, the combined image display means may scroll the reference game image section toward the adjacent game image section after the adjacent game image is scrolled by the specified distance. With such an arrangement, the reference game image section can be effectively restored into the same state before it was divided into image sections.

As described above, since the game images are switched according to the game situation according to the present invention, the game situation and the game progress can be more easily grasped and the game operation can be more smoothly performed.

Further, since the reference game image, the adjacent game image and the reference game image section within the combined game image are suitably scroll-displayed, the game situation can be easily grasped by keeping the game medium character displayed within the corresponding game image as much as possible.

This application is based on Japanese application Ser. No. 11-355191 filed in Japanese Patent Office on Dec. 14, 1999, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A video game apparatus comprising:
    a monitor on which game images are displayed; and
    display control means for displaying the game images on a display surface of the monitor to execute a specified game in a game space, the display control means including:
        reference image display means for displaying a specific game image in the game space as a reference game image,
        combined image display means for producing a combined game image by displaying an adjacent game image neighboring outside a partial game image along a first direction within the reference game image in place of the partial game image, and
        switch control means for switching the display of the reference game image and that of the combined game image to each other according to a game situation,
    wherein the reference image display means scrolls the reference game image in a direction opposite from a moving direction of the game medium character by a specified distance when the game medium character reaches a position slightly before a predetermined position in the first direction within the reference game image.

2. The video game apparatus according to claim 1, wherein the combined image display means displays the adjacent game image in such a manner as to partly overlap the partial game image.

3. The video game apparatus according to claim 1, wherein the game situation includes a position of the game medium character representing a game medium in the game space, the display control means displays the game medium character moving in the game space in such a manner as to follow movement of the game medium character by scrolling, and the switch control means switches the display of the reference game image to that of the combined game image when the game medium character reaches a predetermined position in the first direction within the reference game image.

4. The video game apparatus according to claim 1, wherein the game situation includes a position of the game medium character representing a game medium in the game space, the display control means displays the game medium character moving in the game space in such a manner as to follow movement of the game medium character by scrolling, and the switch control means switches the display of the combined game image to that of the reference game image when the game medium character reaches a predetermined position in the direction opposite from the first direction within the combined game image.

5. The video game apparatus according to claim 4, wherein the combined image display means scrolls the adjacent game image in a direction opposite from the moving direction of the game medium character when the game medium character in the adjacent game image reaches a position slightly before a predetermined position within the adjacent game image while being moved in a direction opposite from the first direction, and the switch control means returns the display of the combined game image to that of the reference game image when the adjacent game image and the reference game image are continuously united in the game space.

6. The video game apparatus according to claim 5, wherein the combined image display means scrolls the reference game image section toward the adjacent game image section after the adjacent game image is scrolled by a specified distance.

7. The video game apparatus according to claim 1, wherein the game situation includes a state where the reference game image is scrolled by a specified distance.

8. A video game apparatus according to claim 1, wherein the combined image display means displays a dividing line at a boundary between the adjacent game image and a remaining image section of the reference game image.

9. A game image display control method for displaying game images on a display surface of a monitor to execute a specified game in a game space, comprising the steps of:

displaying a specific game image in the game space as a reference game image, and switching the display of the reference game image to that of a combined game image produced by displaying an adjacent game image neighboring outside a partial game image along a first direction within the reference game image in place of the partial game image according to a game situation, wherein the reference image display means scrolls the reference game image in a direction opposite from a moving direction of the game medium character by a specified distance when the game medium character reaches a position slightly before a predetermined position in the first direction within the reference game image.

10. The video game apparatus according to claim 9, wherein the game situation includes a state where the reference game image is scrolled by a specified distance.

11. The video game apparatus according to claim 9, wherein:

the combined image display means scrolls the adjacent game image in a direction opposite from the moving direction of the game medium character when the game medium character in the adjacent game image reaches a position slightly before a predetermined position within the adjacent game image while being moved in a direction opposite from the first direction, the switch control means returns the display of the combined game image to that of the reference game image when the adjacent game image and the reference game image are continuously united in the game space; and the combined image display means scrolls the reference game image section toward the adjacent game image section after the adjacent game image is scrolled by a specified distance.

12. A readable storage medium storing a game image display program for displaying game images on a display surface of a monitor to execute a specified game in a game space, the game image display program comprising the steps of:

displaying a specific game image in the game space as a reference game image, and switching the display of the reference game image to that of a combined game image produced by displaying an adjacent game image neighboring outside a partial game image along a first direction within the reference game image in place of the partial game image according to a game situation, wherein the reference image display means scrolls the reference game image in a direction opposite from a moving direction of the game medium character by a specified distance when the game medium character reaches a position slightly before a predetermined position in the first direction within the reference game image.

13. The video game apparatus according to claim 12, wherein the game situation includes a state where the reference game image is scrolled by a specified distance.

14. The video game apparatus according to claim 12, wherein:

the combined image display means scrolls the adjacent game image in a direction opposite from the moving direction of the game medium character when the game medium character in the adjacent game image reaches a position slightly before a predetermined position within the adjacent game image while being moved in a direction opposite from the first direction, the switch control means returns the display of the combined game image to that of the reference game image when the adjacent game image and the reference game image are continuously united in the game space; and the combined image display means scrolls the reference game image section toward the adjacent game image section after the adjacent game image is scrolled by a specified distance.

* * * * *